United States Patent [19]

Werner

[11] 4,059,228

[45] Nov. 22, 1977

[54] SELF CLEANING, PRESSURE RESPONSIVE EMITTER VALVE FOR SOIL IRRIGATION

[75] Inventor: David Werner, Los Angeles, Calif.

[73] Assignee: Salco Products, Inc., Hawthorne, Calif.

[21] Appl. No.: 502,549

[22] Filed: Sept. 3, 1974

[51] Int. Cl.² .............................................. B05B 1/30
[52] U.S. Cl. .................. 239/106; 239/533.1; 239/542
[58] Field of Search ............... 239/106, 111, 452, 453, 239/460, 534, 533, 542, 547, 570, 583; 138/43, 45, 46

[56] References Cited

U.S. PATENT DOCUMENTS

| | | | |
|---|---|---|---|
| 1,040,899 | 10/1912 | Dahmen | 239/452 |
| 2,954,170 | 9/1960 | Goyette et al. | 239/109 |
| 3,036,782 | 5/1962 | Windsor | 239/109 X |
| 3,276,479 | 10/1966 | Windsor et al. | 138/43 |
| 3,518,831 | 7/1970 | Tibbals, Jr. et al. | 239/534 X |
| 3,693,888 | 9/1972 | Rondas et al. | 239/535 |
| 3,719,327 | 3/1973 | McMahan | 239/542 X |
| 3,729,142 | 4/1973 | Garza | 239/542 |
| 3,777,980 | 12/1973 | Allport | 239/542 X |
| 3,806,031 | 4/1974 | Olson | 239/542 X |
| 3,807,430 | 4/1974 | Keller | 239/542 X |
| 3,834,628 | 9/1974 | Selman et al. | 239/542 |
| 3,841,349 | 10/1974 | Todd | 239/542 |
| 3,882,892 | 5/1975 | Menzel | 239/542 X |
| 3,908,694 | 9/1975 | Spears | 239/542 X |

Primary Examiner—John J. Love
Attorney, Agent, or Firm—Lewis B. Sternfels

[57] ABSTRACT

The emitter-valve includes a deformable element placed within a cavity. The element has a stem which extends within a water inlet to the cavity or a base which rests on the inlet wall on the bottom of the cavity so that, upon supply of water, the element deformably moves upward against a wall having a water outlet therein to permit water to flow to soil. A groove across the element top cooperates with an annular protuberance on the water outlet wall so that, as water pressure rises, water flow decreases and, as water pressure decreases, water flow increases. Further included are three deformable fingers of springy material which normally space the element from the water outlet and which briefly resist upward movement of the element and contact of the groove with the annular protuberance upon initial water turn-on to permit the water to spurt through the valve outlet and to carry therewith any lodged solid particulate matter. Also, upon initial water shut-off, the springy fingers suddenly move the element to permit another surge of water through the outlet as water backpressure is relieved.

44 Claims, 31 Drawing Figures

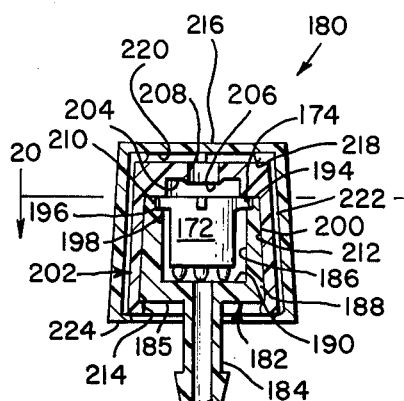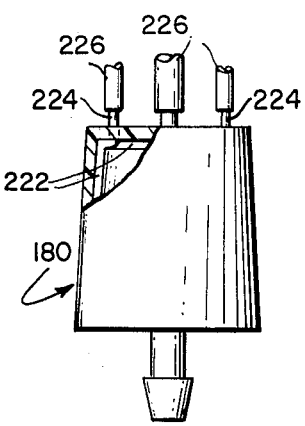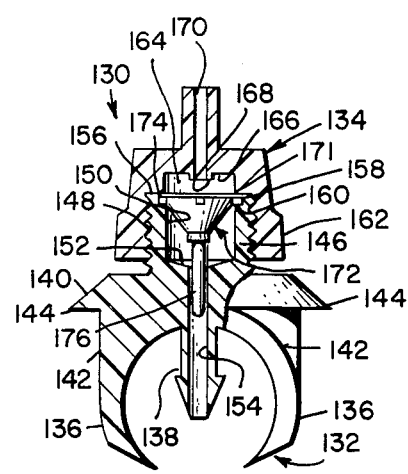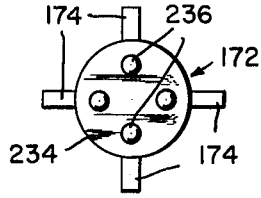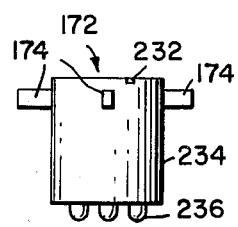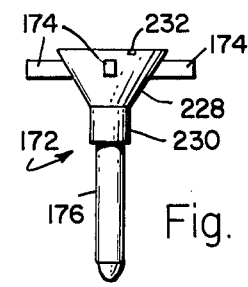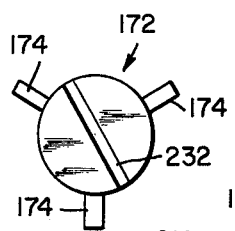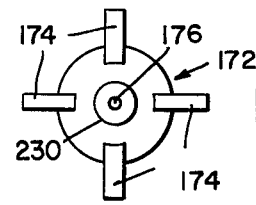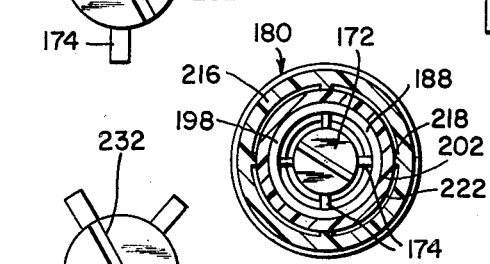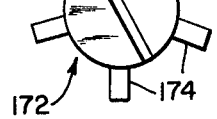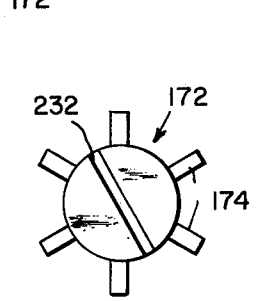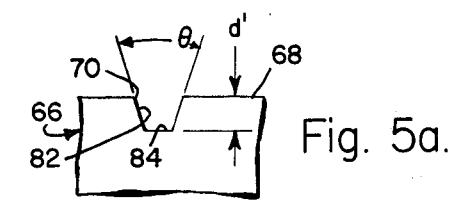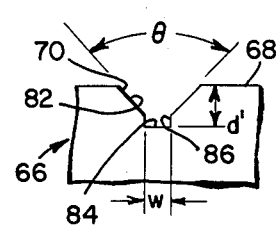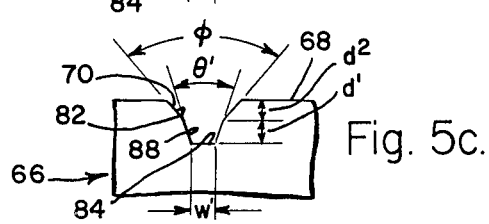

SELF CLEANING, PRESSURE RESPONSIVE EMITTER VALVE FOR SOIL IRRIGATION

BACKGROUND OF THE INVENTION

1. Field of the Invention

The present invention relates to an emitter valve particularly suited for irrigation of soil.

2. Description of the Prior Art

Irrigation of soil for proper growth vegetation requires the supply of sufficient water thereto with added minerals and other nutrients as may be required.

It has been long recognized that indiscriminate watering not only is wasteful of water but also is possibly harmful to plants; therefore, metering of water in accordance with plant requirements has been used. Accordingly, a great many devices have been devised to meet this need, such as described in U.S. Pat. No. 3,547,355 (patented Dec. 15, 1970) and in copending patent application, Ser. No. 331,128 filed Feb. 9, 1973, now U.S. Pat. No. 3,874,591 (patented Apr. 1, 1975).

Regardless of the design of prior art devices, however, many problems still exist. Metering devices, in particular, become clogged with solid particulate matter and algae, especially during periods of non-use, and therefore, present obstacles to precise metering of water. Furthermore, prior art emitters more distant from the source of water receive less water than closer emitters because the available water pressure decreases in proportion to distance, with the result that more distant soil areas receive less water than those closer to the source of water. As a corollary, it has also been found that areas at lower elevations receive more water than those at higher elevations because of the respective build-up or drop-off of pressure as water flows down hill or must be forced up hill. Further, soil textures may differ from a porous sand to a non-porous clay. Some areas may be shaded while others are exposed to the sun. Therefore, the problems which presently exist have not been altogether adequately or satisfactorily met.

SUMMARY OF THE INVENTION

The present invention overcomes these and other problems by providing an emitter valve with an element therein having a resilient flat end with a groove therein which moves against an annular protuberance at the emitter outlet. Thus, flow of water from the emitter is inversely proportional to water pressure. In a preferred embodiment the element is provided with spring-like means so as to normally space the element from the outlet, thereby to impede movement of the element against the outlet during initial turn-on of water and, conversely, to impel the deformable element away from the outlet when the water is turned off. In both cases, water surges either from the initial pressure build up or from relief of pressure having already been built up so as to flush any solid particulate matter or other debris from the emitter valve. Furthermore, when the entire element is made deformable, and is provided with a stem extending within a water inlet of the valve and other centering means, the emitter valve is capable of maintaining a substantially constant flow of water to the soil regardless of elevation or distance from the source of water, provided that an adequate volume of water is permitted to flow through the system. The groove in the deformable element cooperating with the outlet annular protuberance enhances and provides for control of water flow, depending upon the shape of the groove and its cooperation with the annular outlet protuberance.

It is, therefore, an object of the present invention to provide an emitter valve for irrigation of soil.

Another object is the provision of such an emitter valve for furnishing metered amounts of water to the soil.

Another object is to provide an emitter valve for furnishing metered amounts of water to the soil according to varying soil porousity, temperatures, elevations of the soil, and shade conditions.

Another object is the provision of such an emitter valve which is deformable upon application of water supply pressure.

Another object is to provide an emitter valve which is capable of flushing itself out at the times of water turn on and turn off.

Another object is the provision of an emitter valve in which the supply of water to soil is inversely proportional to water pressure, that is, a decrease in water pressure increases the supply of water to soil and an increase in water pressure decreases the supply of water to the soil.

Other aims and objects, as well as a more complete understanding of the present invention, will become apparent from the following explanation of exemplary embodiments and the accompanying drawings thereof.

BRIEF DESCRIPTION OF THE DRAWINGS

FIGS. 5a–5c depict variations of the groove formed in the element shown in FIGS. 3 and 4;

FIG. 18 is a cross-sectional view of another embodiment of the emitter valve of the present invention;

FIG. 19 is a cross-sectional view of a further embodiment of the emitter valve of the present invention;

FIG. 20 is a cross-sectional view of the embodiment shown in FIG. 19 taken along lines 20—20 thereof;

FIG. 21 is an elevational view partly in section illustrating a modification of the embodiment depicted in FIG. 19;

FIG. 22 is an elevational view of another embodiment of the deformable element used in the present invention;

FIG. 23 is a bottom end view of the embodiment shown in FIG. 22;

FIG. 24 is an elevational view of a further embodiment of the deformable element used in the present invention;

FIG. 25 is a bottom end view of the embodiment shown in FIG. 24; and

FIGS. 26a–26c are top end views illustrating modifications of the embodiment depicted in FIGS. 24 and 25.

DESCRIPTION OF THE PREFERRED EMBODIMENTS

Figure 1:
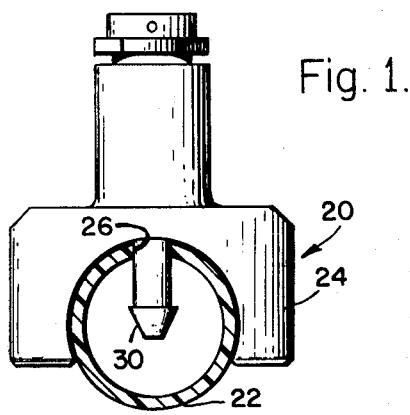
FIG. 1 is an elevational view of an emitter valve secured to a water conduit, shown in section.
Figure 2:
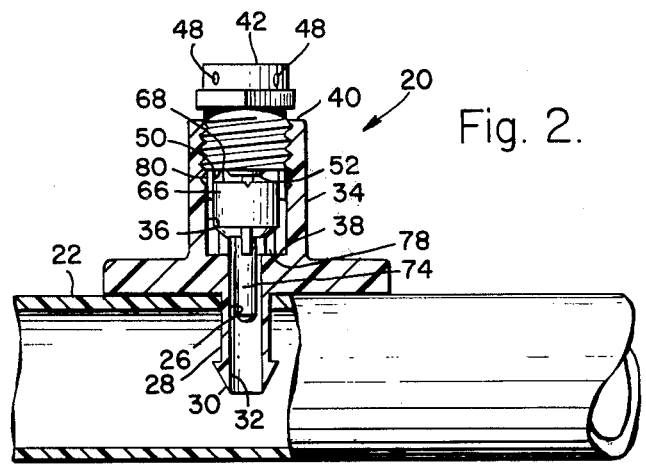
FIG. 2 is a cross-sectional side view of the valve shown in FIG. 1.

Accordingly, FIGS. 1 and 2 depict an emitter valve 20 secured to a conduit 22 which, in turn, is coupled to a source of water in which minerals and other nutrients may be provided. As shown, valve 20 includes side portions 24 surrounding conduit 22 in gripping engagement therewith for attachment of the valve to the conduit. It is to be understood, however, that other forms of attachment to the conduit may be made, such as shown in above-mentioned U.S. Pat. No. 3,547,355 or copending patent application, Ser. No. 331,128 U.S. Pat. No. 3,874,591.

To provide for supply of the water from conduit 22 to valve 20, conduit 22 has an opening 26 therein and valve 20 has an inlet 28 extending therefrom and into conduit 22 through opening 26. An upset nose 30 having a tapered wall terminating inlet 28 facilitates insertion of inlet 28 through opening 26 and prevents withdrawal of the inlet from opening 26, thereby cooperating with side portions 24 to maintain the attachment between the valve and the conduit. Extending through inlet 28 is passage or opening 32 for flow of water from conduit 22 into the interior of valve 20.

The valve further includes a housing 34 which encloses a cavity 36 of substantially cylindrical configuration terminating at an end wall 38 which opens to inlet passage 32. On its other end 40 opposite from wall 38, cavity 36 is provided with means for defining an outlet for the water flowing from conduit 22 and cavity 36 to the soil.

Figure 6:
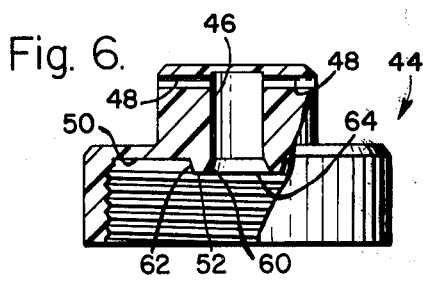
FIGS. 6–8 are embodiments alternate to that depicited in FIGS. 1 and 2 of the present invention.
Figure 8:
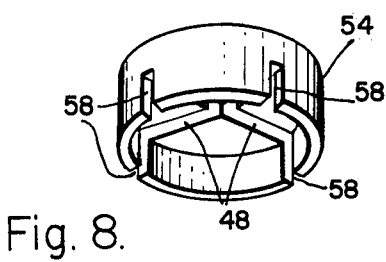
Figure 7:
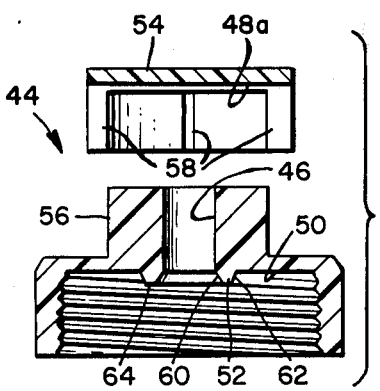

This outlet means may be configured as a screw cap 42 having a threaded engagement with the interior of housing 34, as shown in FIG. 2, or may be configured as a screw cap 44 or 134 having a threaded engagement with the exterior of the housing as shown in FIGS. 6, 7, and 18, or may be configured as a latched or interengaged cap 202 with cover 216 as shown in FIGS. 19–21. Regardless of the particular exterior configuration of caps 42, 44, 134 or 202, each includes a substantially centrally located passage 46, 170 and 208 having outlet orifices 48, 170, 222, and 224 laterally extending therefrom. Cap passage 46, 170 and 208 terminates within cavity 36, 150 and 186 at an end wall 50, 166 and 204 thereof with a substantially annular lip 52, 168 and 206 defining the mouth of passage 46, 170 and 208. The internal configuration of the cap depicted in FIGS. 1, 2 and 6 are substantially the same while the configuration depicted in FIGS. 7 and 8 shows a separate lid 54 which is adapted to be press fitted or adhered by an adhesive, if desired, to a neck portion 56. The orifices of FIGS. 7 and 8 are configured as channels 48a. From the configuration of FIGS. 7 and 8, lid 54 is provided with slots 58 at the end of channels 48a to further enable emission of water to the soil. Since the configurations of FIGS. 18–26 depart slightly from those of FIGS. 1–8, further description of FIGS. 18–26 are deferred to a later point, with similar structures being referenced back to this point.

As best shown in FIGS. 6 and 7, annular lip 52 is champfered outwardly at 60 on its interior and champfered inwardly at 62 on its outside to produce a flat but narrow end surface 64.

Slideably disposed within cavity 36 is a deformable element 66 of suitable elastomeric material, as shown in FIGS. 2–5. Element 66 is of substantially cylindrical configuration, but may be otherwise configured, and is movable between cavity end wall 38 and cap bottom wall 50. At its upper end, element 66 terminates in a substantially flat wall or surface 68 having a V-shaped channel 70 therein. The channel may have several configurations as depicted in FIGS. 5a–5c as more particularly described hereafter. Element 66 further is provided with a second end 72 from which extends a stem 74 which is adapted to extend into passage or opening 32 of inlet 28. Stem 74 is of substantially smaller diameter than that of the remainder of element 66 and a tapered wall 76 joins the main body of element 66 with stem 74. Centered about stem 74 and partially extending downwardly therealong are preferably three legs 78 which support elastomeric element 66 on end wall 38 of cavity 36.

Element 66 is completed by plurality of flexible, spring-like fingers 80, coaxially extending with respect to the axis of the element, which are preferably formed integral with the element and which extend slightly beyond the exterior surface 82 of the element and above top wall surface 68 of the element. Axial fingers 80 provide two functions. One function is to center the element within cavity 36 in conjunctions with stem 74 so that water can flow upwardly through opening 32 of inlet 28 and about stem 74, through the spaces defined by legs 78 and the shell-like space provided between the exterior surface 82 of element 66 and cavity 36, as established by fingers 80, along channel 70 in top wall 68 of the element, through channel 46 of cap 42 or 44, and out through orifices 48 or 48a of the screw cap to the soil.

Fingers 80 also provide another function which is an important aspect of the present invention. As is stated above, element 66 is linearly movable or slideable within cavity 36 between wall 50 of cap 42 or 44 and end wall 38 of cavity 36, stem 74 following the movement of the remainder of the element. In operation, assuming that the water has been shut off, fingers 80 normally space element surface 68 from annular lip 52 and wall 50 of the cap. When the water is turned on, element 66 moves upwardly toward wall 50 but contact between wall 68 of the element and surface 64 of annular lip 52 do not make immediate contact because springy fingers first contact wall 50. However, pressure of the water against element 66 bends the springy fingers to provide contact between wall 68 and surface 64. This momentary prevention of closure of wall 68 against surface 64 permits a surge of water to spurt from emitter valve 20, thereby cleansing any debris or other solid particulate matter, which may have been lodged within the cavity 36 and other channels or openings, from the emitter valve. Furthermore, after the system has been operating for a period of time and it is desired to shut off the supply of water to the soil, upon shut off of the system, springy fingers 80, which have been previously compressed against wall 50 of the cap, impel the element toward wall 38, resulting in a sudden release of built-up water pressure in the system and a consequential surge and escape of water from the emitter, thereby also cleansing any debris and other solid particulate matter from the valve.

To vary this important function of axial fingers 80, more than three may be used (cf. FIGS. 25 to 26c) or, alternatively, their hardness may be increased or decreased according to the springiness desired vis-a-vis the known water pressure with which the emitter is to be applied.

As further description of the operation of the present invention, the water flowing from conduit 22 into cavity 36 forces element 66 towards wall 50 and end surface 64 of annular lip 52. As water pressure increases, upper wall 68 of element 66 is increasingly compressed against lip surface 64, thereby tending to close groove 70 and to restrict the flow of water out through passage 46. Conversely, as water pressure decreases, groove 70 is permitted to open towards its fullest extent, thereby resulting in increased flow of water to passage 46. It follows, therefore, that flow of water to soil from orifices 48 is inversely proportional to water pressure. It is also for this reason that element 66 may be made of a rigid, non-resilient material except only for sufficient resiliency at and adjacent wall surface 68.

Referring now to FIGS. 5a–5c, channel 70 of element 56 may be configured in one of several ways. In FIG. 5a, channel 70 has a sloped wall 82 and a flat bottom 84, the slope of the wall being shown by an angle $\theta$. In FIG. 5b, channel 70 comprises a sloped wall 82 and a flat vertical wall 86, also terminating in flat bottom 84, the angle of wall 82 also being designated by angle $\theta$. In FIG. 5c, channel 70 is configured as a double sloped wall 82 and 88, terminating in flat bottom 84. The vertical distances from the bottom 84 to the upper surface 68, as well as to the junction where sloped walls meet, are identified by distances $d^1$ and $d^2$ while the width of the bottom wall is depicted by $w$ and $w'$. The slope of the walls in FIG. 5c are shown by $\theta'$ and $\phi$.

The particular shape of channel 70 defined by angles $\theta$ and $\phi$ and the vertical distances and widths affect the flow pattern to make it controllable. For example, in the configuration of FIG. 5b, with $\theta=45°$, $w=0.010$ inches, and $d^1=0.005$ inches, at a flow rate at 20 psi the amount of water emitted from orifices 48 were 69 milliliters per minute. For the configuration of FIG. 5b with $\theta=45°$, $w=0.010$ inches, and $d^1=0.017$ inches, the flow rate at 20 psi provided an emission of 130 milliliters per minute. In the configuration of FIG. 5c, with angle $\theta'=26°$, angle $\phi=68°$, $w'=0.010$ inches, and $d^1=0.012$ inches, the flow rate at 20 psi provided emission of 110 milliliters per minute. These emissions were dependent upon element 66 made of an elastomeric material having an approximate hardness of 35 shore of either silicone rubber or natural rubber. The materials of both the valve body and the cap or nut were of polyvinyl chloride and, therefore, relatively inflexible.

Although the above hardness of 35 shore was used, the preferable hardness range is between 30 and 35 shore with the further condition that the material of elastomeric element 66 not take a plastic set. It is to be further understood that the hardness values given are preferred, and that any other hardness may be used so long as the principles of the present invention are attained. For general use, that is, a flow rate of approximately 1.5 gallons per hour at 20 psi, the configuration of FIG. 5a is used in which angle $\theta$ is 45°, $w=0.010$ inches, and the width of the groove at upper wall 68 is 0.028 inches. As shown above by the experimental results, a change in the angle $\theta$, with additional angle $\phi$, and the height, the flow pattern is changed. Increasing the height of the V-shaped groove increases the flow, for a given hardness of emitter material.

Figure 9:
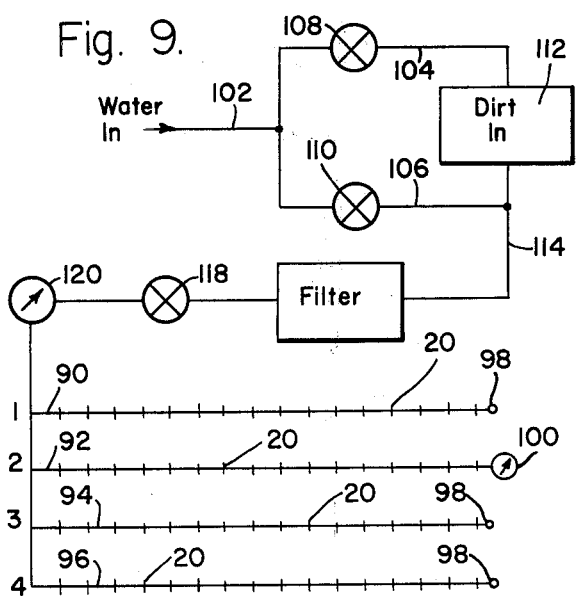
FIG. 9 is a schematic diagram of a test set-up used in obtaining experimental data on the valve of FIGS. 1 and 2.
Figure 10:
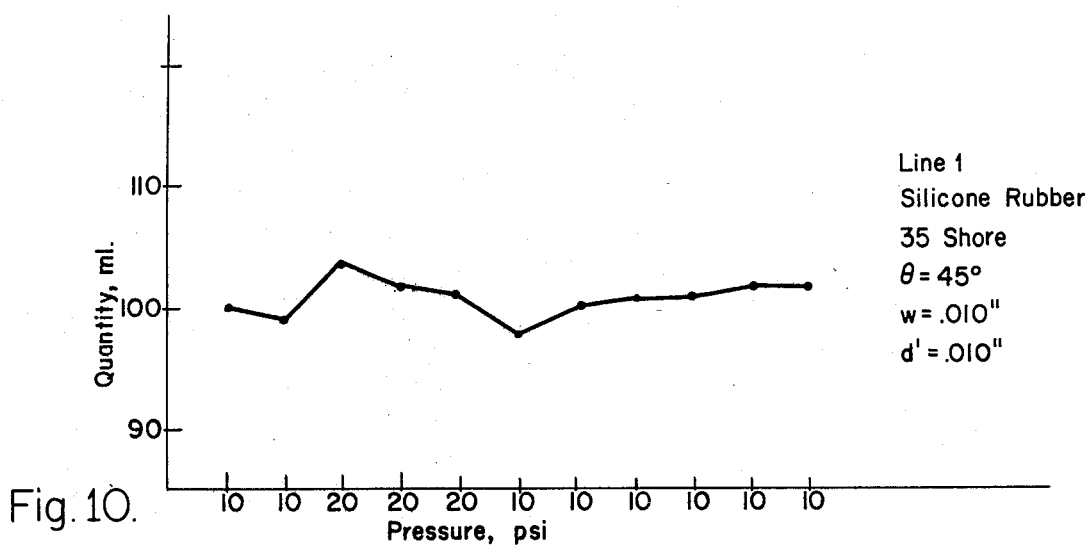
FIGS. 10–17 are graphs depicting actual measurement of water flow under varying conditions utilizing several of the emitter valves of the present invention connected in the test set-up illustrated in FIG. 9.
Figure 11:
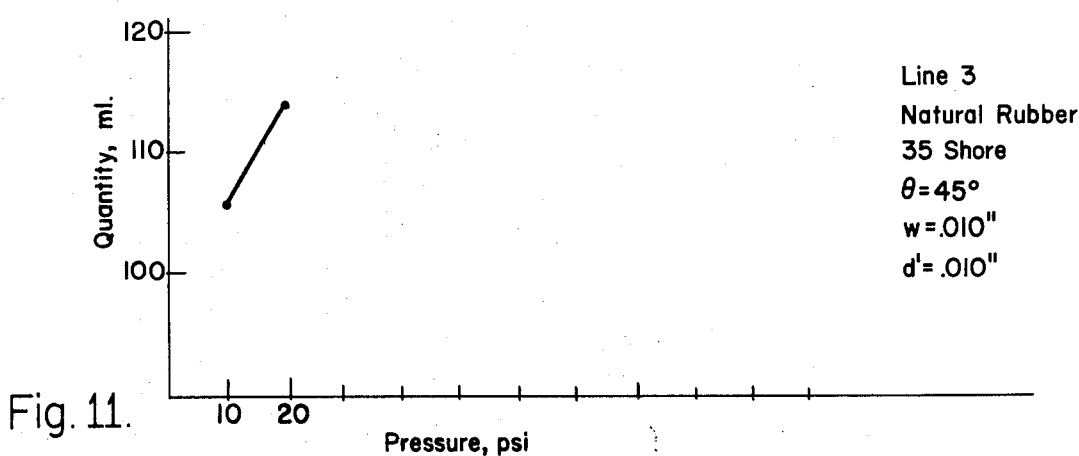
Figure 12:
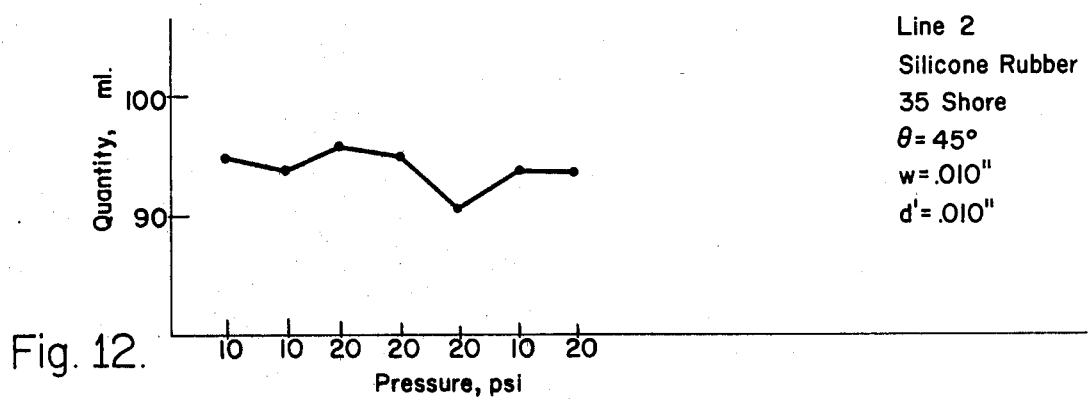
Figure 13:
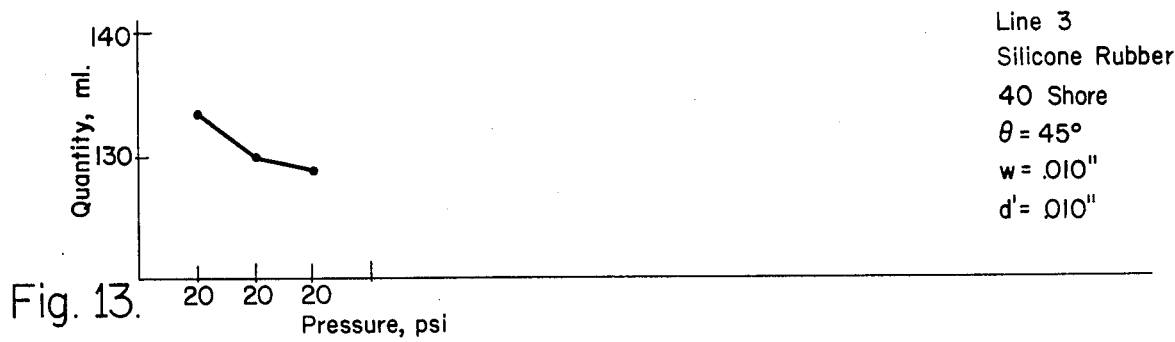
Figure 14:
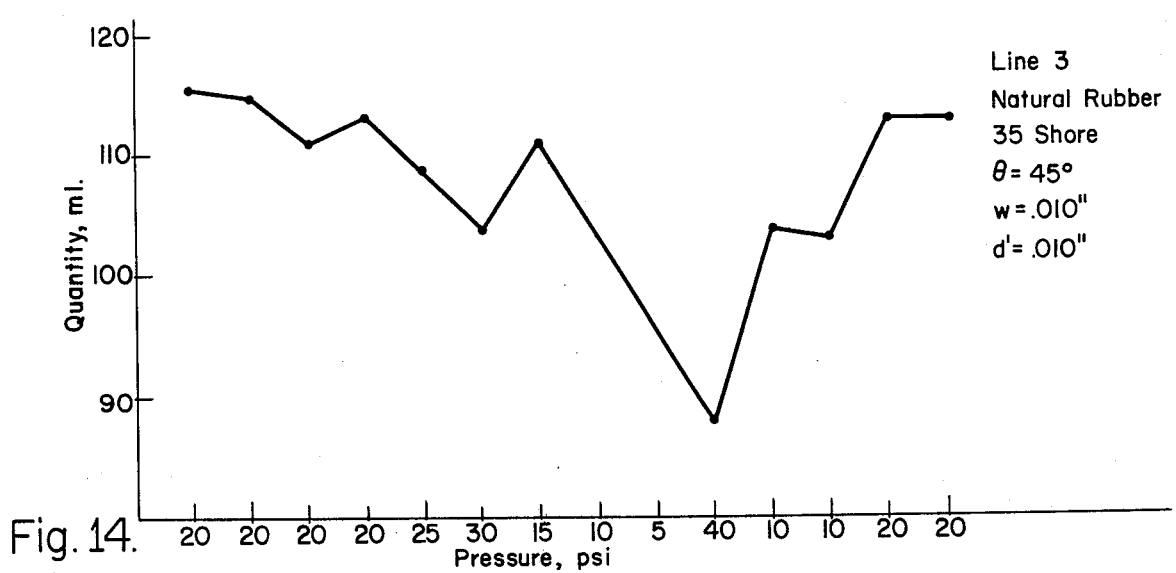
Figure 15:
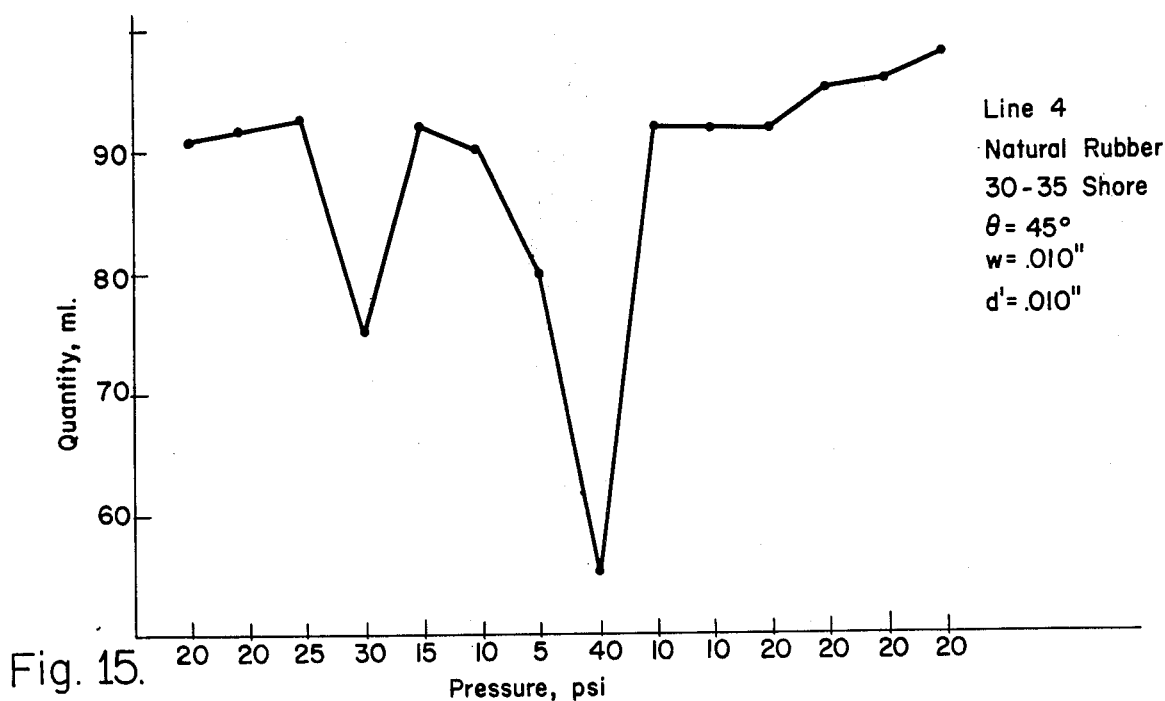
Figure 16:
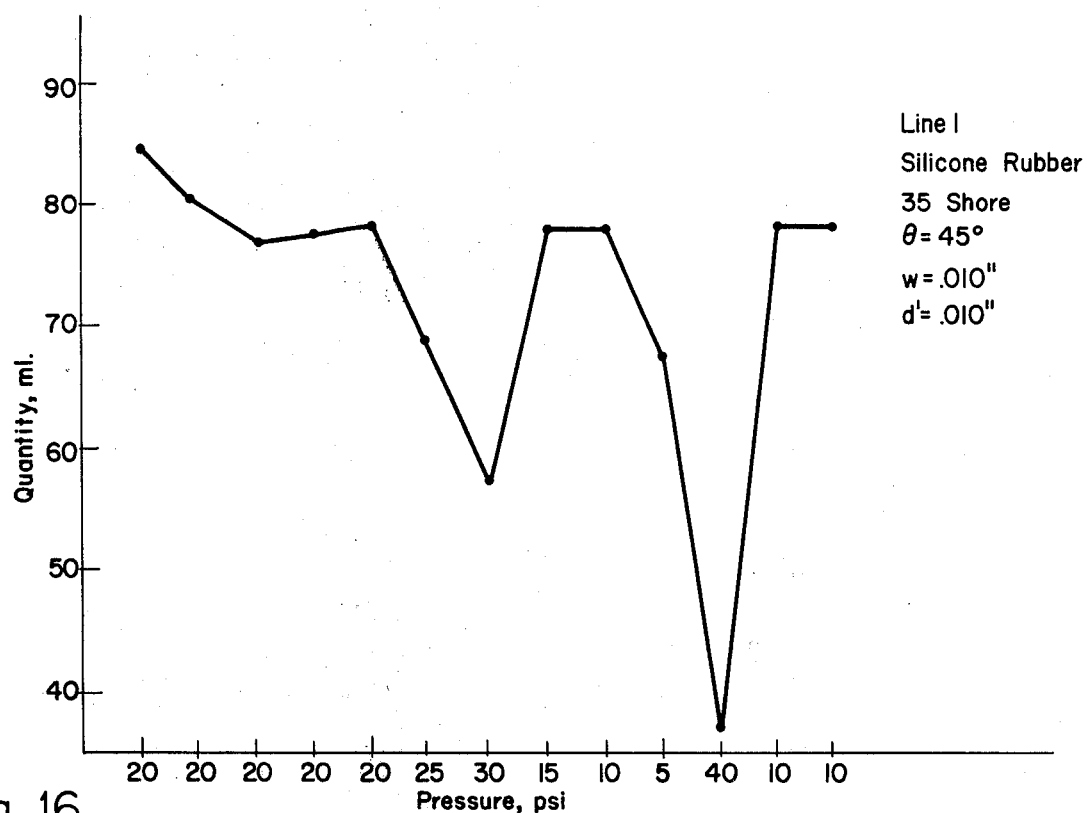
Figure 17:
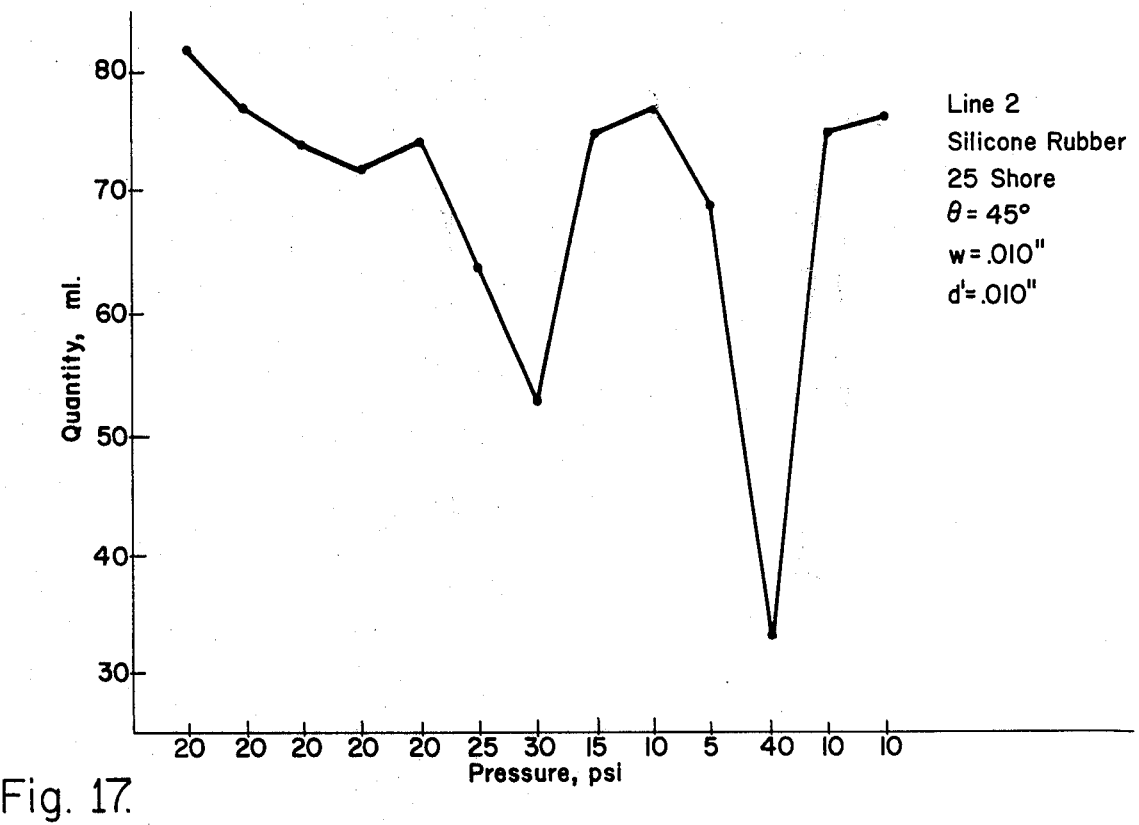

The experimental results given above were obtained utilizing a test arrangement such as shown in FIG. 9. Four lines 90, 92, 94 and 96 were set up with 15 emitter valves connected therein, as depicted by dashed lines in each line. Each of the lines were closed at their ends 98 with a pressure gauge 100 sometimes at the end of line 2, for purposes of verification with a pressure gauge 120. All four lines were supplied with water from an inlet 102 and flowed through one of two paths 104 or 106, depending upon whether valve 108 or valve 110 was open. If valve 108 were open and 110 were closed, the water would flow through a supply 112 of dirt in order to purposely place solid particulate matter within the system. On the other hand, if a supply of dirt were not desired, valve 108 would be closed and valve 110 would be open. In either case, the water flowed therefrom through a path 114 through a filter 116, a pressure regulator 118, and gauge 120 for supply of the water to lines 90–96.

Results of the tests utilizing the system of FIG. 9 are shown in FIGS. 10–17 and are based upon using a regulator having a $\frac{3}{4}$ inch pipe, and an element whose V-groove (FIG. 5a) had an angle $\theta=45°$, $w=0.010$ inches, and $d^1=0.010$ inches. The valve element materials utilized were natural rubbers of hardness 30–45 shore, and hardness 35 shore, and silicone rubbers of hardness 40 shore, 35 shore and 25 shore. The volume of water measured in the graphs depicted show quantities collected in one minute with readings taken at a minimum of 30 minutes apart to insure stabilized pressure within the system. Each point on each graph represents an average of 15 emitters on the designated line. For pressures above 25 psi, the emitters worked according to theory, that is, as water pressure increased the amount of water flow decreased. Conversely, as the pressure decreased, the water flow from the emitter valve increased. For the volume of water available, from 10 to 25 psi, the results are about the same. Below 10 psi pressure, because a $\frac{1}{2}$ inch pipe and $\frac{3}{4}$ inch regulator were used, there was insufficient volume of water flowing in the system when regulator 118 was closed down to provide pressures less than 10 psi, that is, there was insufficient water bearing against elements 66. With larger conduits, the volume of water would be sufficient to show results below 10 psi in accordance with the principles of the present invention. Therefore, the invention worked according to theory, taking into consideration the volume sufficiency problems resulting from small conduits. Furthermore, for a shut down of water and when the water flow was first commenced, water was seen to spurt from the valve, as a result of using elements with fingers 80.

Referring now to FIG. 18, another modification of the present invention is illustrated as an emitter valve 130, comprising a base 132 and a cap 134. Base 132 is provided with side portions 136, which function to grip a conduit in a manner similar to side portions 24 of FIG. 1, and with an inlet 138, which functions in a manner similar to inlet 28 of FIG. 1 for coupling valve 130 to a supply of water.

Side portions 136 are integrally coupled, such as by molding, to an annular ledge 140 with ribs 142 added to afford reinforcement. Ledge 140 is bounded by a sharp-edged diagonal lip or rim 144 to deflect vegetation and plant roots. It has been found that a lip, which does not form a sharp edge, does not adequately deflect vegetation and roots but permits them to grow towards the water outlet, resulting in clogging or piercing of the outlet by the vegetation or roots and subsequent decrease or prevention of water flow to the soil. Thus, the use of sharp-edged lip 144 deflects the vegetation at right angles to the emitter body to thereby prevent interference with flow of water.

Extending above ledge 140 is a housing 146 integrally formed therewith having an external thread 148. Housing 146 is open in its interior to form a cavity 150 bounded at its bottom by an end wall 152 through which a channel or opening 154 extends from cavity 150 to inlet 138 for effecting an inlet for water to the cavity from a water conduit. End wall 152 may be flat or bevelled for purposes to be shortly described. At the other end 156 of housing 146 is an annular opening 158 of greater diameter than that of cavity 150, thus defining an annular flat 160.

Cap 134 is threadedly engaged with external thread 148 of base housing 146. A plurality of finger-engageable detents 162 are formed on the exterior of the cap to facilitate the threaded engagement between cap 134 and base 132. The cap is provided with a recess 164 which is bounded by a wall 166 having an annular lip 168 centrally positioned about and forming the entrance to a channel 170. Wall 166, annular lip 168 and channel 170 function in the same manner and for the same purposes as wall 50, annular lip 52 and channel 46 of FIGS. 2, 6 and 7 in cooperation with element 66. Accordingly, reference is made to the previous description for such function and purpose. Cap 134 is completed by a wall 171 which extends from recess 164 to its threads and is disposed to contact with end 156 of base housing 146 but to overlap annular opening 158 thereof.

Disposed within cavity 150 is a deformable component or metering element, generally designated by indicium 172, such as depicted and described in greater detail in FIGS. 22–26c. Regardless of its specific configuration, deformable element 172 is provided with a plurality of fingers 174 which extend radially with respect to the axis of the element. Radial fingers 174 are disposed to reside within annular opening 158 between wall 171 of cap 132 and annular flat 160 of housing 146.

If deformable element 172 takes the configuration of the element depicted in FIGS. 22 and 23, it is preferred that end wall 152 of housing 146 have a bevelled form solely to facilitate entry of stem 176 of element 172 into channel or opening 154 of base 132. If element 172 is configured as depicted in FIGS. 24–26c, end wall 152 may be bevelled or flat.

With reference to FIGS. 19 and 20, a further embodiment of the present invention is denoted by indicium 180. As compared with emitter valve 130 of FIG. 18, which permits disassembly thereof for exchange, for example, of element 172, emitter valve 180 is configured in part as a non-repairable device which is not intended for disassembly, although it is possible, as will become apparent, to separate it into its component parts. As in emitter valve 130, emitter valve 180 includes a base 182 with an inlet 184 depending from wall 185 of base 182, an interior cavity 186 positioned within a housing 188 and terminating in an end wall 190, an opening or channel 192 extending from cavity 186 to a water conduit, and a housing or base end 194, defining an annular opening 196 and an annular flat 198. Unlike emitter valve 130, the exterior 200 of base 182 of emitter valve 180 is smooth and slightly tapered towards its end 194.

Positioned about base 182 is a cap 202 which, like cap 134 of valve 130, includes a wall 204 with a centrally positioned annular lip 206 for forming the entrance of an outlet channel 208, and a wall 210 which is disposed to extend over annular flat 198 of base 182 when the base and cap 202 are secured together. Unlike emitter valve 130, the interior surface 212 of cap 202 of emitter valve 180 is smooth and has an inwardly formed annular lip 214 which is disposed to snap around wall 185 when the base is inserted into the cap for affixing them together.

A locking cover 216 having interior ribs 218 is disposed to be placed about cap 202, ribs 218 extending about the inside top surface 220 to form a thin-walled chamber 222 separating cover 216 from cap 202. At the bottom of cover 216 is an annular lip 224 which is disposed to snap about annular lip 214 of cap 202 to lock cover 216 to cap 202. A deformable element 172 is positioned within cavity 186 with radial fingers 174 of the element extending within annular opening 196. Accordingly, water entering through inlet 184 exits through thin-walled chamber 222 to the soil.

Alternatively, as shown in FIG. 21, emitter valve 180 may be modified to include a plurality of nipples 224 communicating with the thin-walled chamber 222. Tubes 226 are secured to each nipple 224 and may be extended to plant pots for multi-pot feeding.

Referring now to FIGS. 22 and 23, another embodiment of the deformable element is configured as element 172, having a plurality of radial fingers 174 extending therefrom. Element 172 of FIGS. 22 and 23 includes a downwardly tapering body 228, terminating in a cylindrical portion 230 and stem 176 for reception within inlet channel 154 or 192. Like element 66 of FIGS. 3, 4 and 5a–c, element 172 of FIGS. 22 and 23 is provided with a groove 232 which is configured as groove 70 of FIGS. 3, 4 and 5a–5c.

A further embodiment of deformable element 172 is shown in FIGS. 24 and 25, comprising a cylindrical body 234 from which radial fingers 174 extend. A plurality of toes 236 extend from the bottom of element 172 of FIGS. 24 and 25 and are disposed to rest upon end walls 152 or 190 of the valves of FIGS. 18 and 19.

Figure 3:
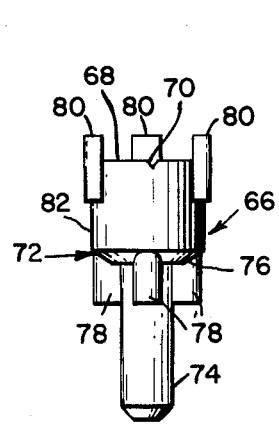
FIG. 3 is a view in elevation of one embodiment of the deformable element used in the present invention.
Figure 4A:
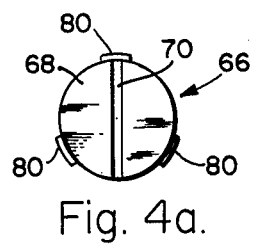
FIGS. 4a and 4b depict end views of the top and bottom of the element shown in FIG. 3.
Figure 4B:
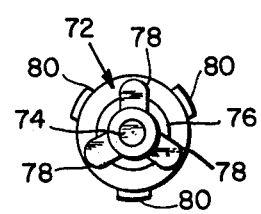

The embodiments of FIG. 24 may be further modified such as shown in FIGS. 26a, 26b and 26c, it being understood that this modification is as applicable to that of FIGS. 22 and 3. This modification is directed to the use of three, five or six radial fingers 174. This variation in the number of radial fingers, or any other variation, is used to determine the amount of flow for an emitter head or valve at a given pressure and hardness of material. Generally, for a given pressure and material hardness, as the number of radial fingers increase, the flow of water also increases due to the increased stiffness against movement of the deformable element within its cavity.

The difference between the deformable elements of FIGS. 22 and 24 is directed to the rate of water flow desired. The FIG. 22 configuration provides a slower flow control for small watering needs (.e.g. ⅛ to ¾ gal/hr at 20 psi) than that of FIG. 24, which is to be used for larger, more conventional drip or trickle irrigation (e.g. ¾ to 3 gal/hr at 20 psi). The variation within the exemplary ranges is determined by groove 70 of FIGS. 5a–5c, for the given configuration at a given water pressure.

In all cases, like the configurations of FIGS. 1–8, when the emitter valves of FIGS. 18–21 were placed in a system, such as depicted in FIG. 9, with an increase in pressure, the flow of water decreased and, with a decrease in water pressure, the flow of water increased, to compensate for rough terrain or uneven topography for providing a substantially even distribution of water throughout the system. Data for the configurations of FIGS. 18–26, similar to that depicted in the graphs of FIGS. 10–17, were obtained when emitter valves 130 and 180 were placed into the system of FIG. 9, replacing valves 20.

Although the invention has been described with reference to particular embodiments thereof, it should be realized that various changes and modifications may be made therein without departing from the spirit and scope of the invention.

What is claimed is:

1. In an irrigation system for controlled supply of water under pressure from a source to soil, an emitter valve coupled to the source of water comprising:
    a housing having means for defining a substantially cylindrical interior cavity opening at a first end and terminating at a second end in a substantially flat wall, said flat wall having means for defining an opening substantially centrally located therein;
    an inlet secured to said housing and having means for defining a passage therethrough coupled to the source of water and extending through said flat wall opening means for enabling flow of the water from the source and into said interior cavity means;
    a deformable substantially cylindrical element of elastomeric material slideably placed in said interior cavity means for moving with substantially linear movement between said first and second ends thereof, and including a first end for defining a wall facing said first end opening of said interior cavity means and a second end facing said second end of said interior cavity means and having means for supporting said deformable element on said flat wall of said interior cavity means;
    a cap engaged to said housing for closure of said first end of said interior cavity means, and having an end wall facing said first end wall of said deformable element and means for defining at least one passage opening through said cap end wall to said interior cavity means and to the exterior of said housing for enabling flow of the water from said interior cavity means to the soil;
    means for defining a distance between said cap end wall and said flat wall of said interior cavity means being greater than the distance between said first end wall and said second end of said deformable element for enabling said deformable element to slideably reciprocate within said interior cavity means towards and away from said cap end wall in response to the supply of the water, and for enabling increased flow of the water to the soil as the water pressure decreases and for enabling decreased flow of the water to the soil as the water pressure increases; and
    surge inducing means cooperating with said interior cavity means and said deformable element for centering said deformable element in said cavity means, for normally maintaining a separation of said element from said opening means through said cap end wall and for impeding movement of said element towards said cap end wall when the water is first caused to flow and for impelling said element away from said cap end wall when the water is first caused to cease flowing, for thereby enabling a surging and rapid flow of the water through said opening means.

2. An irrigation system as in claim 1 wherein said end wall of said cap comprises a substantially flat surface and a substantially annular lip substantially centered on said cap end wall and defining said passage means opening to said interior cavity means and extending thereinto for sole contact with said first end wall of said deformable element.

3. An irrigation system as in claim 1 wherein said deformable element further includes a plurality of flexible springy fingers secured to and spaced substantially equally about the periphery of said element first end wall and extending towards said end wall of said cap for defining said surge inducing and centering means for flushing out any solid particulate matter from said emitter valve.

4. An irrigation system as in claim 1 further including a stem extending from said second end of said deformable element into said inlet opening means and wherein said distance means between said cap and wall and said flat wall of said interior cavity means further enables said deformable element stem to slideably reciprocate within said inlet opening means wherein said second end of said deformable element includes means for defining a tapered wall narrowing to and terminating at said stem and a plurality of legs substantially equally spaced about said tapered wall and said stem and secured thereto for providing said means for supporting said deformable element on said flat wall of said interior cavity means.

5. An irrigation system as in claim 1 wherein said deformable element includes means for defining a substantially flat bottomed V-shaped groove in and diagonally across the width of said first end wall of said element for cooperating with said cap end wall passage means, thereby for improving the flow of the water from said interior cavity means into said passage means of said cap.

6. An irrigation system as in claim 5 wherein said V-shaped groove means includes means for defining an angled side wall configuration for controlling the rate of flow and quantity of the water flowing through said V-shaped groove means and into said passage means of said cap.

7. An irrigation system as in claim 5 wherein said end wall of said cap comprises a substantially flat surface and a substantially annular lip substantially centered on said cap end wall for defining said passage means for opening to said interior cavity means and extending thereinto for sole contact with said first end wall of said deformable element and for centered contact about said V-shaped groove means.

8. An irrigation system as in claim 1 wherein said cap includes a neck portion extending above said cap end wall through which said passage means extends and a lid secured to and over said neck, said lid having means for defining a plurality of channels transverse to and communicating with said passage means and opening to the soil.

9. An emitter valve for irrigation of soil from a supply of water under pressure comprising:
    means for defining a cavity with a passage opening to the soil at an end wall, said passage opening means comprising an annular lip having champfered sides extending from said end wall for defining an annular flat and narrow end surface spaced outwardly from said end wall;
    means for defining an inlet coupled to said cavity means and to the supply of the water; and
    means in said cavity means for defining a deformable surface having a groove therein extending across said surface for a length greater than the diameter of said annular flat and narrow end surface, and for cooperating with said cavity means for axially moving towards and away from said passage opening means and into contact with said flat and narrow end surface upon supply of the water under the pressure for providing increased flow of the water through said passage opening means upon decrease in the water pressure and for providing decreased flow of the water through said passage opening means upon increase in the water pressure.

10. An emitter valve as in claim 9 further comprising: means having spring memory cooperating with said deformable surface means and said cavity means both for centering said deformable surface means in said cavity means to provide a shell-shaped fluid flow path therebetween and for normally spacing said deformable surface means from said passage opening means.

11. An emitter valve as in claim 10 further including means for defining at least one wall of said cavity means, said spring memory means being positioned between said deformable surface means and said wall means.

12. An emitter valve as in claim 10 further including means on said element for supporting said element on a surface surrounding said inlet means in spaced relationship from said inlet means.

13. An emitter valve as in claim 9 further including means having elastomeric memory positioned between said deformable surface and said end wall for normally spacing said deformable surface from said passage opening means and for impeding the contact of said deformable surface with said flat and narrow end surface of said passage opening means when the water is first caused to flow and for enhancing separation of said deformable surface from said flat and narrow end surface when the water is first caused to cease flowing, for thereby enabling a rapid increased and surging flow of the water through said passage opening means.

14. An emitter valve as in claim 13 wherein said elastomeric memory means comprises a plurality of springy fingers secured to said deformable surface means and extending towards said end wall.

15. In an irrigation system for controlled supply of water under pressure from a source of the water to soil, an emitter valve coupled to the source of water comprising:
means including a housing for defining a substantially cylindrical interior cavity opening at a first end and terminating at a second end in a wall, said second end wall having means for defining an opening substantially centrally located therein;
an inlet secured to said housing and having means for defining a passage therethrough coupled to the source of water and extending through said second end wall opening means for enabling flow of the water from the source and into said interior cavity means;
a deformable element of elastomeric material slideably placed in said interior cavity means for substantially linearly moving between said cavity first and second ends thereof, and including p2 a first element end means for defining a wall substantially at said first end of said interior cavity means,
means for defining a second element end facing said second end of said interior cavity means, and
resilient means for normally spacing said deformable element from said first end of said interior cavity means and for centering said element in said interior cavity means;
a cap engaged to said housing at said cavity first end for terminating said interior cavity means, and having
an end wall facing said first end wall of said deformable element, and
means for defining at least one passage opening through said cap end wall to said interior cavity means and to the exterior of said housing for enabling flow of the water from said interior cavity means to the soil; and
means for defining a distance between said cap end wall and said second end wall of said interior cavity means being greater than the distance between said first end wall and said second end of said deformable element, thereby for defining means for enabling said deformable element substantially to slideably reciprocate within said interior cavity means towards and away from said cap end wall in response to the supply of the water, and for enabling increased flow of the water to the soil as the water pressure decreases and for enabling decreased flow of the water to the soil as the water pressure increases.

16. An irrigation system as in claim 15 wherein said end wall of said cap includes means for defining a substantially annular flat lip having smooth angled sides substantially centered on said cap end wall and for defining said passage means opening to said interior cavity means, said lip means extending into said interior cavity means for sole contact with said first end wall of said deformable element; and
wherein said first end wall of said deformable element includes means therein for defining a groove extending across said end wall and beyond said annular flat lip.

17. An irrigation system as in claim 15 wherein said second end means of said deformable element includes means for defining a tapered wall narrowing to and terminating at a stem extending into said inlet opening means and a plurality of legs substantially equally spaced about said tapered wall and said stem and secured thereto for supporting said deformable element on said second end wall of said interior cavity means.

18. An irrigation system as in claim 15 wherein said second end means of said deformable element includes means for defining a tapered wall narrowing to and terminating at a stem extending into said inlet opening.

19. An irrigation system as in claim 18 wherein said second end wall of said interior cavity is bevelled for facilitating placement of said stem into said inlet opening means.

20. An irrigation system as in claim 15 wherein said deformable element is of substantially cylindrical configuration and wherein said second end means thereof includes means for defining at least one protuberance for supporting said deformable element on said second end wall of said interior cavity means and substantially coaxially within said interior cavity means.

21. An irrigation system as in claim 15 wherein said deformable element includes means for defining a substantially flat bottomed V-shaped groove in and diagonally across the width of said first end wall of said element for improved flow of the water from said interior cavity means into said passage means of said cap.

22. An irrigation system as in claim 21 wherein said V-shaped groove means includes means for defining an angled side wall configuration for controlling the rate of flow and quantity of the water flowing through said V-shaped groove means and into said passage means of said cap.

23. An irrigation system as in claim 21 wherein said end wall of said cap includes means for defining a substantially annular lip substantially centered on said cap end wall and for defining said passage means opening to said interior cavity means, said lip means extending into said interior cavity means for establishing sole contact with said first end wall of said deformable element and for effecting substantially centered contact about said V-shaped groove means.

24. An irrigation system as in claim 15 further including means for defining a cover extending about said cap, said cover means including means for spacing said cap from said cover means for defining a plurality of channels communicating with said passage means and opening to the soil.

25. An emitter valve for irrigation of soil from a supply of water comprising:
an enclosure having means therein for defining a cavity with surrounding side walls, and walls terminating said cavity means and having therein means for defining an outlet to the soil and means for defining an inlet coupled to the supply of water for enabling flow of the water to the soil;
an element positioned in said cavity means and having means for acting as a valve with said outlet means; and
means positioned between said terminating wall of said outlet means and said element for generally spacing said element from said cavity side walls, while normally spacing said element from contact with and at least partial closure of said outlet means for impeding movement of said element towards said outlet means when the water is first caused to flow and for impelling said element away from said outlet means when the water is first caused to cease flowing, for thereby enabling a surging and rapid flow of the water from said cavity means.

26. An emitter valve as in claim 25 wherein said impeding and impelling means comprises means for defining a plurality of fingers having spring memory and extending outwardly from said element.

27. An emitter valve as in claim 26 further including means for defining a number of said finger means and a hardness of the material thereof correlated with the pressure of the water for determining the rate at which said element moves towards and away from said outlet means.

28. An emitter valve as in claim 26 wherein said finger means extend parallel to the axis of said element and beyond the periphery thereof.

29. An emitter valve as in claim 26 wherein said finger means extend radially from the axis and periphery of said element.

30. An emitter valve for irrigation of soil from a supply of water under pressure comprising:
means for defining a cavity with a passage opening to the soil and means for defining an inlet coupled to the supply of the water;
means in said cavity means for defining a deformable surface for movement thereof towards and away from said passage opening means and into contact therewith upon supply of the water under the pressure for providing increased flow of the water through said passage opening means upon decrease in the water pressure and for providing decreased flow of the water through said passage opening means upon increase in the water pressure;
means for defining a wall in said cavity means; and
means for providing elastomeric memory and contactable with and placed between said wall means and said deformable surface both for generally centering of said deformable surface in said cavity means and for normally spacing said deformable surface from said passage opening means, thereby for impeding the contact of said deformable surface with said passage opening means when the water is first caused to flow and for enhancing separation of said deformable surface from said passage opening means when the water is first caused to cease flowing, for thereby enabling a rapid increased flow of the water through said passage opening means.

31. An emitter valve as in claim 30 wherein said elastomeric memory means comprises a plurality of springy fingers secured to said deformable surface means, extending outwardly from the periphery thereof, and extending towards said wall means.

32. In an irrigation system for controlled supply of water under pressure from a source of the water to soil, an emitter valve coupled to the source of water comprising:
a housing having means for defining a substantially cylindrical interior cavity opening at a first end and terminating at a second end in a wall, said second end wall having means for defining an opening substantially centrally located therein;
an inlet secured to said housing and having means for defining a passage therethrough coupled to the source of water and extending through said second end wall opening means for enabling flow of the water from the source and into said interior cavity means;
a deformable element of elastomeric material slideably placed in said interior cavity means for substantially linear movement between said first and second ends thereof and including a first end means for defining a wall substantially at said first end opening of said interior cavity means, means for defining a second end facing said second end of said interior cavity means and means for positioning said deformable element at a preferred position within said interior cavity means;
a cap engaged to said housing for covering said first end of said interior cavity means, and having an end wall facing said first end wall of said deformable element and means for defining at least one passage opening through said cap end wall to said interior cavity means and to the exterior of said housing for enabling flow of the water from said interior cavity means to the soil;
means for defining a distance between said cap end wall and said second end wall of said interior cavity means being greater than the distance between said first end wall and said second end of said deformable element defining means for enabling said deformable element substantially to slideably reciprocate within said interior cavity means towards and away from said cap end wall in response to the supply of the water, and for enabling increased flow of the water to the soil as the water pressure decreases and for enabling decreased flow of the water to the soil as the water pressure increases; and said positioning means of said deformable element including a plurality of flexible springy fingers secured to and spaced substantially equally about and beyond at least the radial periphery of said element both for centering of said element in said cavity means as well as for impeding movement of said element towards said end wall of said cap when the water is first caused to flow and for suddenly moving said element away from said end wall of said cap when the water is first caused to cease flowing, for thereby enabling a surge of the water to flow from said interior cavity means and through said cap passage means for flushing out any solid particulate matter from said emitter valve.

33. In an irrigation system for controlled supply of water under pressure from a source of soil, an emitter valve coupled to the source of water comprising:
a housing having means for defining a substantially cylindrical interior cavity opening at a first end and terminating at a second end in a wall, said second end wall having means for defining an opening substantially centrally located therein;
an inlet secured to said housing and having means for defining a passage therethrough coupled to the source of water and extending through said second end wall opening means for enabling flow of the water from the source and into said interior cavity means;
a deformable element of elastomeric material slideably placed in said interior cavity means for substantially linearly moving between said first and second ends thereof and including a first end means for defining a wall substantially at said first end opening of said interior cavity means, means for defining a second end facing said second end of said interior cavity means and means for positioning said deformable element at a preferred position within said interior cavity means;
a cap engaged to said housing for covering said first end of said interior cavity means, and having an end wall facing said first end wall of said deformable element and means for defining at least one passage opening through said cap end wall to said interior cavity means and to the exterior of said housing for enabling flow of the water from said interior cavity means to the soil;
means for defining a distance between said cap end wall and said second end wall of said interior cavity means being greater than the distance between said first end wall and said second end of said deformable element defining means for enabling said deformable element substantially to slideably reciprocate within said interior cavity means towards and away from said cap end wall in response to the supply of the water, and for enabling increased flow of the water to the soil as the water pressure decreases and for enabling decreased flow of the water to the soil as the water pressure increases;
means for defining a cover extending about said cap, said cover means including means for spacing said cap from said cover means for defining a plurality of channels communicating with said passage means and opening to the soil; and
means on said cover means and on said cap for defining latches for respective locking of said cover means to said cap and of said cap to said housing.

34. An emitter valve for irrigation of soil from a supply of water comprising:
an enclosure having means therein for defining a cavity for defining an outlet to the soil and for defining an inlet coupled to the supply of water for enabling flow of the water to the soil;
an element positioned in said cavity means and having means for cooperating with said outlet means and for impeding movement of said element towards said outlet means when the water is first caused to flow and for impelling said element away from said outlet means when the water is first caused to cease flowing, for thereby enabling a rapid flow of the water from said cavity means, said impeding and impelling means comprising means for defining a plurality of fingers extending substantially radially from the axis of said element and having spring memory and extending outwardly from said element; and
means for defining a wall of said cavity means having means therein for defining a groove for receiving the ends of said radially extending finger means.

35. An emitter valve as in claim 34 further including means for defining a groove extending across a surface of said element and means for defining an annular lip terminating said cavity outlet means and extending towards said element surface for establishing sole contact therewith and for being substantially bisected by said groove means, and thereby for providing increased and decreased flow of the water through said cavity outlet means respectively proportional to decrease and increase in water pressure.

36. An emitter valve for irrigation of soil from a supply of water under pressure comprising:
means for defining a cavity with a passage opening to the soil at an end wall, said passage opening means comprising an annular lip having champfered sides extending from said end wall for defining an annular flat and narrow end surface spaced outwardly from said end wall;
means for defining an inlet coupled to said cavity means and to the supply of the water;
means in said cavity means for defining a deformable surface having a groove therein extending across said surface for a length greater than the diameter of said annular flat and narrow end surface, and for cooperating with said cavity means for axially moving towards and away from said passage opening means and into contact with said flat and narrow end surface upon supply of the water under the pressure for providing increased flow of the water through said passage opening means upon decrease in the water pressure and for providing decreased flow of the water through said passage opening means upon increase in the water pressure;
a plurality of springy fingers having elastomeric memory secured to said deformable surface means and extending towards said end wall for normally spacing said deformable surface from said passage opening means and for impeding the contact of said deformable surface with said flat and narrow end surface of said passage opening means when the water is first caused to flow and for enhancing separation of said deformable surface from said flat and narrow end surface when the water is first caused to cease flowing, for thereby enabling a rapid increased and surging flow of the water through said passage opening means, said fingers further being secured about and transversely beyond the periphery of said deformable surface means for centering of said deformable surface means within said cavity means and for providing means for defining a shell-shaped opening between said cavity means and said deformable surface means thereby aiding the flow of the water.

37. An emitter valve as in claim 36 further including a stem secured to said deformable surface means, said stem extending into said inlet for further centering of said deformable surface means within said cavity means and for maintaining the configuration of said shell-shaped opening means.

38. An emitter valve for irrigation of soil from a supply of water under pressure comprising:
   means for defining a cavity with a passage opening to the soil and means for defining an inlet coupled to the supply of the water;
   means in said cavity means for defining a deformable surface for movement thereof towards and away from said passage opening means and into contact therewith upon supply of the water under the pressure for providing increased flow of the water through said passage opening means upon decrease in the water pressure and for providing decreased flow of the water through said passage opening means upon increase in the water pressure;
   means for defining a wall in said cavity means; and
   a plurality of springy fingers secured to said deformable surface means and extending towards and contactable with said wall means and said deformable surface for normally spacing said deformable surface from said passage opening means, for impeding the contact of said deformable surface with said passage opening means when the water is first caused to flow and for enhancing separation of said deformable surface from said passage opening means when the water is first caused to cease flowing, for thereby enabling a rapid increased flow of the water through said passage opening means, said fingers further being secured about and transversely beyond the periphery of said deformable surface means for centering of said deformable surface means within said cavity means and for providing means for defining a shell-shaped opening between said cavity means and said means having said deformable surface for thereby aiding the flow of the water.

39. An emitter valve as in claim 38 further including a stem secured to said deformable surface means, said stem extending into said inlet for further centering of said deformable surface means within said cavity means and for maintaining the configuration of said shell-shaped opening means.

40. An emitter valve for irrigation of soil from a supply of water under pressure comprising:
   means for defining a cavity with a passage opening to the soil;
   means for defining an inlet coupled to said cavity means and to the supply of the water;
   a valve member in said cavity means axially moveable towards and away from said passage opening means;
   means for defining at least one springy finger having elastomeric memory secured between said valve member and a wall in said cavity means for normally spacing said valve member from said passage opening means and for impeding movement of said valve member towards said passage opening means when the water is first caused to flow and for enhancing separation of said valve member from said passage opening means when the water is first caused to cease flowing, for thereby enabling a rapid increased and surging flow of the water through said passage opening means, said finger means further being secured about and transversely beyond the periphery of said valve member for centering of said valve member within said cavity means and for defining a shell-shaped opening between said cavity means and said valve member for thereby aiding the flow of the water.

41. The emitter valve of claim 55 further comprising:
   a cover extending about said cavity means;
   means between said cover and said cavity means for spacing said cavity means from said cover and for defining at least one channel coupling said valve with the soil; and
   means on said cover and on said cavity means securing said cover and said cavity means together.

42. An emitter valve as in claim 34 further including means for defining a terminus of said wall of said cavity means comprising means for defining a flat surface extending radially from the axis of said cavity means and terminating in a wall spaced radially outwardly from said flat surface, a cap including said outlet means having a wall facing and closing said cavity means at said cavity means terminus for defining said groove means.

43. An emitter valve as in claim 42 further including means for defining a cover extending about said cap, said cover means including means for spacing said cover means from said cap and for defining a plurality of channels opening to the soil.

44. An emitter valve as in claim 42 further including a plurality of nipples having means therein for defining openings to said channel means and a conduit secured to each of said nipples and extending to individual pots with the soil therein.

* * * * *